Sept. 28, 1926.
S. G. NEAL
1,601,584
ENGINE EQUIPMENT FOR AIR BRAKE APPARATUS
Original Filed Feb. 26, 1925    2 Sheets-Sheet 1
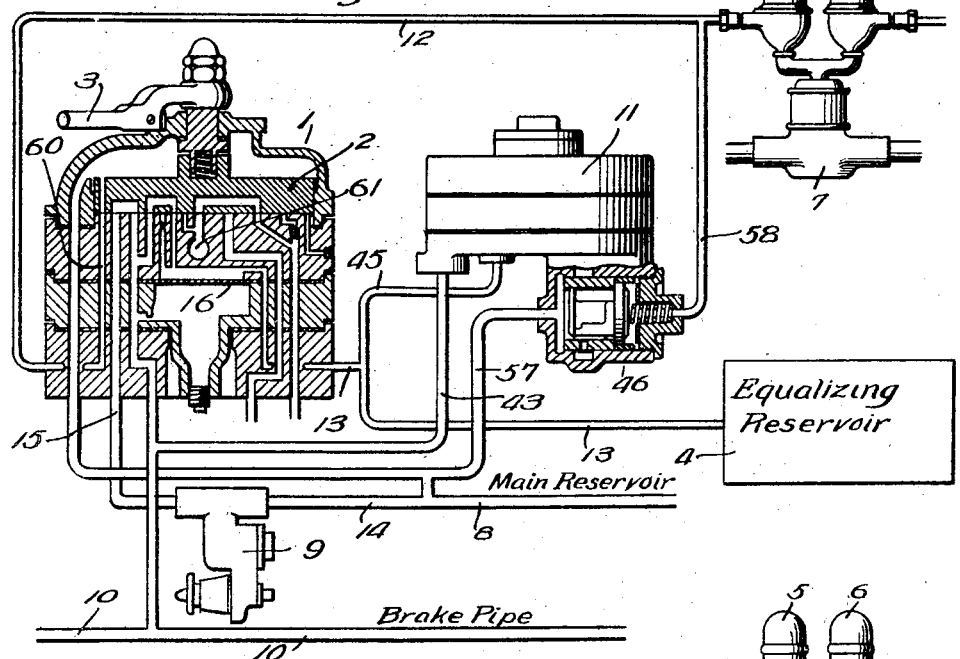
Fig.1. Running Position
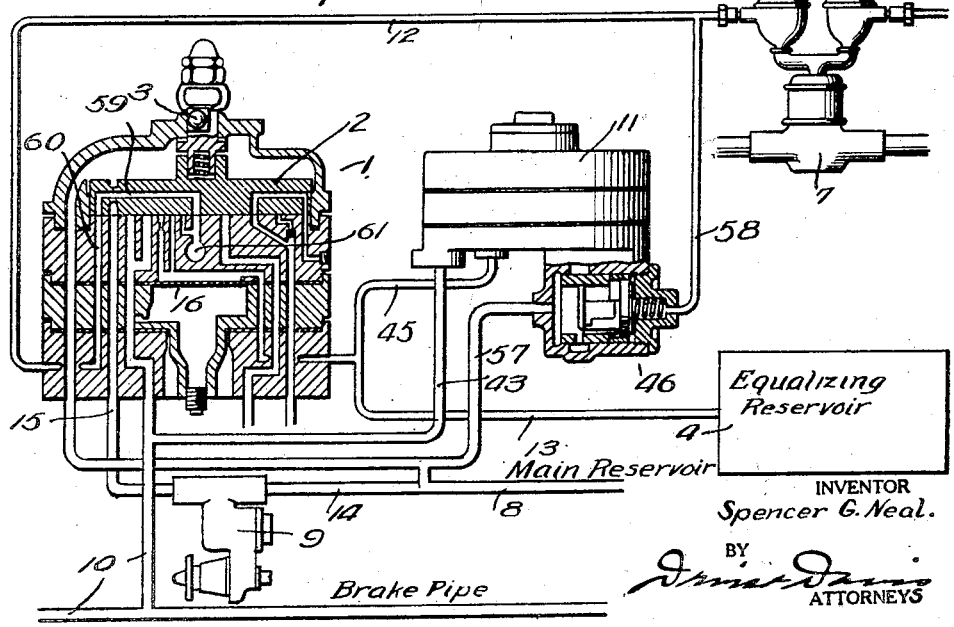
Fig.2. Lap Position
INVENTOR
Spencer G. Neal.
BY
ATTORNEYS Sept. 28, 1926.
S. G. NEAL
1,601,584
ENGINE EQUIPMENT FOR AIR BRAKE APPARATUS
Original Filed Feb. 26, 1925      2 Sheets-Sheet 2
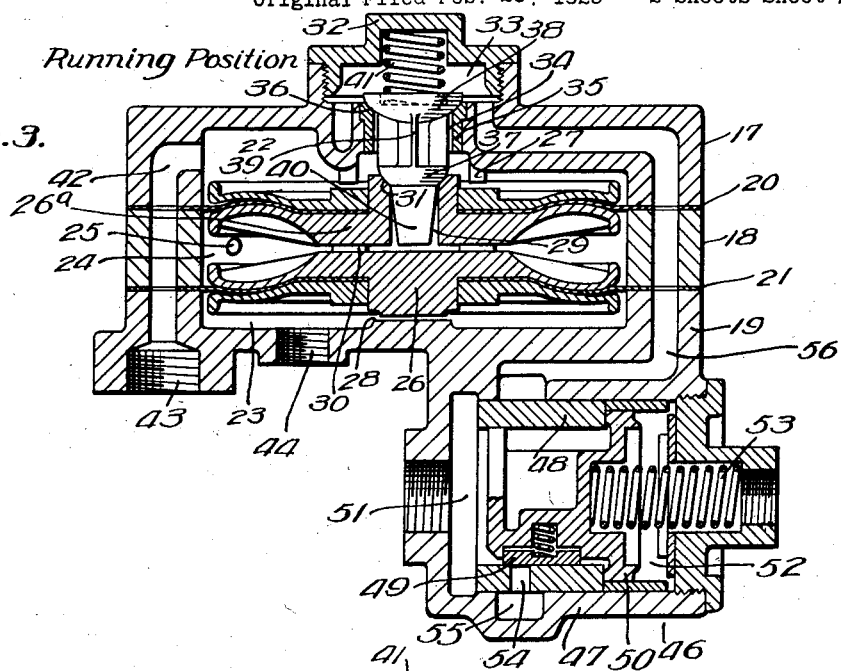
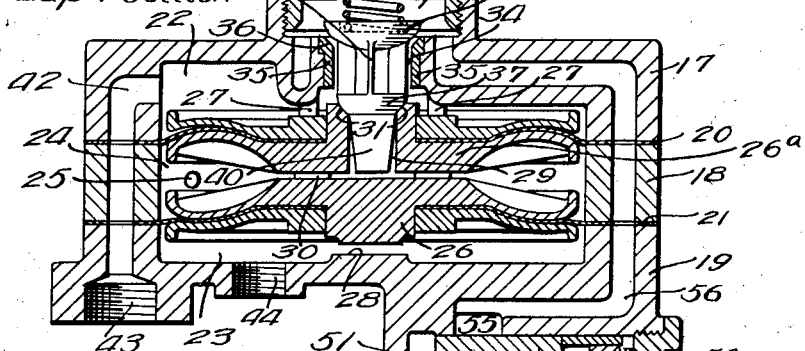
INVENTOR
Spencer G. Neal.
BY
ATTORNEYS Patented Sept. 28, 1926.

1,601,584

UNITED STATES PATENT OFFICE.

SPENCER G. NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

ENGINE EQUIPMENT FOR AIR-BRAKE APPARATUS.

Application filed February 26, 1925, Serial No. 11,775. Renewed December 26, 1925.

This invention relates to apparatus controlled by the manipulation of the engineer's brake valve for regulating and maintaining the brake pipe pressure.

In Patent No. 1,089,576, dated March 10, 1914 is shown a brake pipe compensating valve designed to maintain against brake pipe leakage any established brake pipe pressure. The compensating valve in that patent not only operates to maintain an established brake pipe pressure but also operates as a brake pipe vent valve, taking the place of the usual equalizing discharge valve of the well known engineer's brake valve. The compensating valve of that patent is operative in all positions of the engineer's brake valve. It is desirable to render the valve ineffective as a compensating feed valve in all positions of the engineer's brake valve except the lap position. It is necessary, however, that the compensating valve act as a brake pipe vent valve at all times when a reduction in brake pipe pressure is desired.

The main object of this invention is to provide a brake pipe compensating valve which will be operative in the lap position of the brake valve and which will be ineffective as a feed valve in all other positions of the said brake valve.

Another object of the invention is to provide a compensating valve controlled by the opposing pressures of the brake pipe and the equalizing reservoir and operating as a brake pipe vent valve when the equalizing reservoir pressure is below the brake pipe pressure and operating as a compensating feed valve when the brake pipe pressure is below the equalizing reservoir pressure, means being provided whereby the engineer's brake valve in lap position will render the compensating valve effective, the engineer's brake valve in all other positions rendering the said valve ineffective as a compensating feed valve.

There are other important objects and advantages of the invention which will appear hereinafter.

In the drawings:

Fig. 1 is a diagrammatic view partly in section of certain portions of the standard Westinghouse ET equipment with the invention embodied therein, the engineer's brake valve being shown in running position;

Fig. 2 a view similar to Fig. 1 showing the engineer's brake valve in lap position;

Fig. 3 a vertical longitudinal sectional view of the compensating valve showing the parts in the positions they will assume with the engineer's brake valve in running position;

Fig. 4 a view similar to Fig. 3 showing the parts in the position they will assume with the engineer's brake valve in lap position; and Fig. 5 a detail sectional view of a portion of the compensating valve with the parts in the positions they will assume with the engineer's brake valve in service position.

Referring to the various parts by numerals 1 designates the ordinary or standard Westinghouse automatic brake valve as used with the Westinghouse ET engine equipment, said valve being illustrated diagrammatically in the drawings. 2 designates the rotor of the engineer's brake valve and 3 the handle for manipulating the rotor in the usual manner. 4 designates the equalizing reservoir which is connected to the brake valve in the usual manner; 5 designates the low pressure governor and 6 the high pressure governor. These governors control the passage of steam through the steam valve 7 from the boiler to the compressor. 8 designates the pipe leading to the main reservoir and 9 designates the usual automatic feed valve. 10 designates the brake pipe and 11 the compensating valve. The low pressure governor is connected to the usual port in the engineer's brake valve by means of a pipe 12; and the equalizing reservoir is connected to the usual port in the brake valve by a pipe 13. The feed valve is connected to the main reservoir by pipe 14, the opposite side of said feed valve being connected to the usual port in the brake valve by a pipe 15.

The engineer's brake valve is operated precisely as in the standard Westinghouse ET equipment and it is thought to be unnecessary to more particularly describe it herein. The compensating valve, hereinafter described, takes the place of the equalizing discharge valve of the engineer's brake valve, and as shown in the drawings, the equalizing discharge piston and valve have been removed and the equalizing chamber is closed by a blind gasket 16.

The compensating valve 11 is shown as comprised of three circular castings 17, 18, and 19, the casting 18 being in the form of a ring clamped between the end castings 17 and 19. Between the castings 17 and 18 is arranged a transverse brake pipe diaphragm 20 and between the castings 18 and 19 is arranged a transverse equalizing reservoir diaphragm 21. In the casting 17 above the diaphragm 20 is formed a brake pipe chamber 22. In the casting 19 below the diaphragm 21 is formed an equalizing reservoir chamber 23, and between the diaphragms 20 and 21 is formed an atmospheric chamber 24. The ring 18 serves to space the diaphragms 20 and 21 from each other and to form the atmospheric chamber. This chamber is open to atmosphere through the port 25 formed through the ring 18. The two diaphragms are centrally supported by rigid structures 26 and 26ª. The diaphragms and their central supporting structures are pressed toward each other by the opposing pressures in chambers 22 and 23 so that the diaphragms move together. The structure 26 is formed with upwardly extending lugs which contact with the lower surface of the central portion 26ª and hold said structures spaced apart to form the channel 30 which is open around its margin into the atmospheric chamber 24. It will, of course, be understood that the central diaphragm supporting structure may be of any suitable construction. Stops 27 limit the upward movement of the diaphragms and stop 28 limits the downward movement thereof so that the said diaphragms will have only a limited up-and-down movement in response to variations in pressures in the chambers 22 and 23. The central rigid portion 26ª of the diaphragm 20 is formed with a large central bore 29 which opens at its lower end into the channel formed between the parts 26 and 26ª, so that the lower end of said bore is in direct communication with the atmospheric chamber 24. The upper end of the bore 29 opens into the brake pipe chamber 22 and is formed with a valve seat 31. On the top of the casting 17 is screwed a cap 32 which forms a supply valve chamber 33. This chamber is in communication with the brake pipe chamber 22 through a large central passage 34. This passage is provided with a bushing 35, the upper end of which forms a valve seat 36. A brake pipe vent valve 37 is adapted to fit tightly on the valve seat 31, and a brake pipe supply valve 38 is adapted to fit tightly on valve seat 36. The two valves 37 and 38 are rigidly connected together by vertical ribs or wings 39 so that said valves will move together. The valve 37 is formed with a depending stem 40 which fits loosely in the bore 29 and serves as a guide means for the valve and for the diaphragm structure when said structure moves downwardly independently of the valves. A spring 41 confined between the cap 32 and the valve 38 normally holds said valve seated. Chamber 22 is connected to the brake pipe through passage 42 and a pipe connection 43. The equalizing reservoir chamber 23 is connected to the equalizing reservoir through passage 44 and pipe connection 45.

A main reservoir cut-off valve 46 controls communication between the main reservoir and the chamber 33 above the brake pipe supply valve 38. This cut-off valve comprises a casing 47 preferably cast integral with the casting 19 and provided with an internal annular bushing 48. The lower portion of the bushing forms a seat for a slide valve 49 which is operatively connected to a piston 50 operating in a chamber formed in the casing 47, said piston serving as a movable abutment separating a main reservoir chamber 51 from a supplemental reservoir chamber 52. A spring 53 normally holds the valve 49 in its inner position, in which position the said valve closes a port 54. Port 54 leads into a channel 55, said channel being connected to chamber 33 by a passage 56. The main reservoir chamber 51 is connected to the main reservoir pipe 8 by a pipe 57. The supplemental main reservoir chamber 52 is connected to the low pressure governor pipe 12 by a pipe 58. Main reservoir pressure is present in chamber 51 at all times. Main reservoir pressure is present in chamber 52 when the engineer's brake valve is in running position, in which position of the said valve pipe 12 is connected to the main reservoir chamber of said valve. When the main reservoir pressure is balanced on opposite sides of the piston 50 the spring 53 will force the valve 49 to its closed position thereby cutting off communication between the main reservoir and the chamber 33. When the engineer's brake valve is placed in lap position, as illustrated in Fig. 2, a port 59 in the rotor 2 of said valve will connect the low pressure governor port 60 to the atmospheric port 61 of the said brake valve. In this position of the engineer's brake valve the pipe 12 and the pipe 58 will be connected to atmosphere so that the air in chamber 52 will flow to atmosphere through the engineer's brake valve. The high main reservoir pressure in chamber 51 will force the piston and the valve 49 outwardly, compressing spring 53 and opening the port 54. This will place the main reservoir in direct and free communication with chamber 33 above the brake pipe supply valve 38 and thus render the compensating valve operative and effective as a brake pipe feed valve so long as the engineer's brake valve remains in lap position. In this position of the engineer's brake valve the compensating valve will operate to maintain the brake pipe pressure substantially equal to the equalizing reservoir pressure which was established by the service operation of the engineer's brake valve. When the engineer's brake valve is returned to release position or running position, or in fact to any position which will connect the low pressure governor pipe 12 to the main reservoir, the pressure will again build up in chamber 52 and when said pressure has balanced or substantially so with the pressure in chamber 51 the spring 53 will again move the cut-off valve to close port 54 and thereby cut off the main reservoir from chamber 33.

Operation: Before describing the operation it should be recalled that this compensating valve performs all the functions of the equalizing discharge valve and its piston (said piston being dispensed with and removed from the piston chamber of the engineer's valve as already stated), and in addition to such functions, this compensating valve performs certain other functions which will hereinafter be described. The engineer's valve proper will perform all of its well known functions, and maintain its various positions as before, namely, full release, running, service, lap and emergency position. The small exhaust port 59 formed in the rotor of the engineer's brake valve will not, in any way, interfere with the normal or standard operation of the engineer's brake valve. If the brake valve is used without the compensating valve 11 and with the usual equalizing discharge valve and piston, the port 59 will merely connect the low pressure governor pipe 12 to atmosphere when the engineer's brake valve is in lap position. This will make the operation of the low pressure governor more positive because it will release from pipe 12 all pressure and will ensure the low pressure governor valve closing and remaining closed. It is therefore clear that the extra port 59 in the engineer's brake valve will not interfere with the use of that valve in the standard ET equipment, but as a matter of fact, will improve the operation of the valve in connection with the standard parts of the ET equipment even though the compensating valve be omitted. The charging of the brake pipe is caused, as is well known in present braking systems of the standard type, by placing the engineer's valve in the full release position in order quickly to charge the brake pipe; said engineer's valve being placed at the running position, as in present practice, as soon as the desired maximum brake pipe pressure has been obtained. The brake pipe having thus been charged to the required pressure and the equalizing reservoir 4 also being charged to an equality with the train pipe pressure, the result will be that the pressure in the equalizing reservoir chamber 23, which is in communication with the equalizing reservoir 4, will be the same as the brake pipe pressure in the brake pipe chamber 22 of the compensating valve, said chamber 22 being in direct communication with the brake pipe through the pipe 43. With the pressure as just described, in order to make a reduction of the brake pipe pressure the brake valve is placed in the service position, thereby releasing air from the equalizing reservoir 4 to the atmosphere to any desired amount, and thus through pipe 45 releasing pressure from the equalizing chamber 23 of the compensating valve below the pressure in the brake pipe chamber 22 of said compensating valve. The result of this change of pressure will be to allow the excess pressure in chamber 22 on the upper side of diaphragm 20 to lower the diaphragms and the parts connected therewith to the position shown in Fig. 5 thus opening a passage around the valve 37 to release brake pipe air through the chamber 24 and port 25 to atmosphere. When the brake pipe pressure in the brake pipe chamber 22 has thus been reduced substantially to the reduced or established pressure in equalizing reservoir chamber 23, said diaphragms and the parts carried thereby will move upward until the seat 31 engages the valve 37, thus cutting off further escape of brake pipe air. If the engineer's brake valve be now placed in lap position, as shown in Fig. 2, the low pressure governor pipe 12 will be vented to atmosphere through port 59 and atmospheric port 61 of the brake valve. This will vent the chamber 52 to atmosphere and permit the pressure in chamber 51 to move the cut-off valve to the position shown in Fig. 4. In this position the main reservoir is connected to the chamber 33 above the supply valve 38 as hereinbefore described. The compensating valve is now effective as a brake pipe feed valve and its operation will be dependent upon the differences in pressures in the brake pipe chamber 22 and in the equalizing reservoir chamber 23. Should the pressure in chamber 22 be reduced by reason of brake pipe leakage, the superior pressure in the equalizing reservoir chamber 23 will move the diaphragm and the valves 37 and 38 upwardly. This operation will open the supply valve 38, as shown in Fig. 4, and permit main reservoir air to flow from chamber 33 past valve 38 into the brake pipe chamber 22 and thence to the brake pipe through pipe 43. So long as the brake pipe pressure remains below the equalizing reservoir pressure the supply valve 38 will be held open. As the brake pipe leakage is continuous, if not constant, the supply valve will be held open sufficiently to supply air to the brake pipe to compensate for the brake pipe leakage. The diaphragms and the supply valve will assume a position, which might be termed a position of equilibrium, wherein the supply valve will be held open to supply air to the brake pipe at the rate of the leakage. Of course if the leakage should stop the brake pipe pressure would be immediately built up to a substantial equality with the equalizing reservoir pressure and the supply valve would then be closed. Because of the continuous leakage, however, there must be a continuous supply and for that reason the supply valve will be held open as long as the engineer's brake valve is held in lap position.

When the engineer's brake valve is placed in full release position or in any other position in which it places the low pressure governor pipe 12 in communication with the main reservoir chamber of the engineer's brake valve, the cut-off valve 49 will be moved to close the port 54 and thereby cut the main reservoir from communication with the chamber 33. In the running position of the engineer's brake valve, the brake pipe will be connected to the main reservoir through the usual feed valve 9 and in this position of the brake valve the cut-off valve 49 will be in position to close the port 54 and thereby render the compensating valve ineffective as a brake pipe feed valve.

What I claim is:

1. An air brake apparatus comprising an engineer's brake valve, a brake pipe compensating valve, means whereby the brake valve in running position will render the compensating valve ineffective, and means whereby the brake valve in lap posistion will render the compensating valve effective.

2. An air brake apparatus comprising a brake pipe, an engineer's brake valve, an equalizing reservoir, a brake pipe compensating valve, a brake pipe feed valve, means whereby the brake valve in service position will reduce the pressure in the equalizing reservoir and establish therein a pressure equal to the desired brake pipe pressure, means whereby the reduced pressure in the equalizing reservoir will permit the compensating valve to be opened by brake pipe pressure to connect the brake pipe to atmosphere, the established pressure in the equalizing reservoir closing the brake pipe vent when the brake pipe has been reduced to a substantial equality with the established pressure in the equalizing reservoir, means whereby the engineer's brake valve in running position will render the compensating valve ineffective and will connect the main reservoir to the brake pipe through the feed valve, means whereby the engineer's brake valve in lap position will connect the main reservoir to the compensating valve and render the compensating valve effective to maintain the brake pipe pressure from the main reservoir and at a substantial equality with the established pressure in the equalizing reservoir, and means whereby the engineer's brake valve in lap position will close the feed valve communication to the brake pipe.

3. An air brake apparatus comprising a brake pipe, an engineer's brake valve, a main reservoir, an equalizing reservoir, a brake pipe feed valve, a brake pipe compensating valve, means whereby the engineer's brake valve in running position will connect the main reservoir to the brake pipe through the brake pipe feed valve and will close communication between the main reservoir and the compensating valve, means whereby the engineer's brake valve in lap position will close communication between the main reservoir and the brake pipe through the brake pipe feed valve and will open communication between the main reservoir and the brake pipe through the compensating valve, and means whereby the pressure in the equalizing reservoir will control communication from the main reservoir to the brake pipe through the compensating valve in the lap position of the engineer's brake valve.

4. An air brake apparatus comprising an engineer's brake valve, a brake pipe compensating valve, an equalizing reservoir, means whereby the brake valve in running position will render the compensating valve ineffective, and means whereby the brake valve in lap position will render the compensating valve effective to maintain the brake pipe at an equality with the pressure in the equalizing reservoir.

5. An air brake apparatus comprising a brake pipe, an engineer's brake valve, a main reservoir, an equalizing reservoir, a brake pipe compensating valve, means whereby the engineer's brake valve in running position will connect the main reservoir to the brake pipe and will close communication between the main reservoir and the compensating valve, means whereby the engineer's brake valve in lap position will close communication between the main reservoir and the brake pipe and will open communication between the main reservoir and the compensating valve, and means whereby the pressure in the equalizing reservoir will control communication from the main reservoir to the brake pipe through the compensating valve in the lap position of the engineer's brake valve.

6. An air brake apparatus comprising a brake pipe, an engineer's brake valve, a brake pipe compensating valve subject to brake pipe pressure opposed to the pressure of an equalizing reservoir and controlling communication between the brake pipe and atmosphere and between the main reservoir and the brake pipe, means controlling communication between the main reservoir and the compensating valve, means whereby the engineer's brake valve in running position will close communication between the main reservoir and the compensating valve, and means whereby the engineer's brake valve in lap position will open communication between the main reservoir and the compensating valve.

7. An air brake apparatus comprising a brake pipe, an engineer's brake valve, a main reservoir, an equalizing reservoir, a brake pipe compensating valve subject to brake pipe pressure opposed to the pressure of the equalizing reservoir and controlling communication between the brake pipe and atmosphere and between the main reservoir and the brake pipe, the equalizing reservoir pressure tending to open communication between the main reservoir and the brake pipe and the brake pipe pressure tending to open communication between the brake pipe and atmosphere, means controlling communication between the main reservoir and the compensating valve, means whereby the engineer's brake valve in running position will close communication between the main reservoir and the compensating valve, and means whereby the engineer's brake valve in lap position will open communication between the main reservoir and the compensating valve.

8. An air brake apparatus comprising a brake pipe, an engineer's brake valve, a main reservoir, an equalizing reservoir, a brake pipe compensating valve subject to brake pipe pressure opposed to the pressure of the equalizing reservoir and controlling communication between the brake pipe and atmosphere and between the main reservoir and the brake pipe, the equalizing reservoir pressure tending to open communication between the main reservoir and the brake pipe and the brake pipe pressure tending to open communication between the brake pipe and atmosphere, a normally closed cut-off valve controlling communication between the main reservoir and the compensating valve, means whereby the engineer's brake valve in running position will permit the cut-off valve to close communication between the main reservoir and the compensating valve, and means whereby the engineer's brake valve in lap position will permit main reservoir air to move the said cut-off valve to open communication between the main reservoir and the compensating valve.

9. An air brake apparatus comprising a brake pipe, an engineer's brake valve, a main reservoir, an equalizing reservoir, a brake pipe compensating valve subject to brake pipe pressure opposed to the pressure of the equalizing reservoir and controlling communication between the brake pipe and atmosphere and between the main reservoir and the brake pipe, the equalizing reservoir pressure tending to open communication between the main reservoir and the brake pipe and the brake pipe pressure tending to open communication between the brake pipe and atmosphere, a normally closed cut-off valve controlling communication between the main reservoir and the compensating valve, a piston connected to said valve and subject to balanced air pressures on opposite sides thereof, and means whereby the engineer's brake valve in lap position will reduce the pressure on one side of said piston and thereby permit the pressure on the opposite side of said piston to move the cut-off valve to open communication between the main reservoir and the compensating valve.

10. An air brake apparatus comprising a brake pipe, an engineer's brake valve, a main reservoir, an equalizing reservoir, a brake pipe compensating valve subject to brake pipe pressure opposed to the pressure of the equalizing reservoir and controlling communication between the brake pipe and atmosphere and between the main reservoir and the brake pipe, the equalizing reservoir pressure tending to open communication between the main reservoir and the brake pipe and the brake pipe pressure tending to open communication between the brake pipe and atmosphere, a normally closed cut-off valve controlling communication between the main reservoir and the compensating valve, a piston connected to said valve, means whereby the engineer's brake valve in running position will admit balanced air pressures on opposite sides of said piston, and means whereby the engineer's brake valve in lap position will reduce the pressure on one side of said piston and thereby permit the pressure on the opposite side of said piston to move the cut-off valve to open communication between the main reservoir and the compensating valve.

11. An air brake apparatus comprising a brake pipe, an engineer's brake valve, a main reservoir, an equalizing reservoir, a brake pipe compensating valve subject to brake pipe pressure opposed to the pressure of the equalizing reservoir and controlling communication between the brake pipe and atmosphere and between the main reservoir and the brake pipe, the equalizing reservoir pressure tending to open communication between the main reservoir and the brake pipe and the brake pipe pressure tending to open communication between the brake pipe and atmosphere, a normally closed cut-off valve controlling communication between the main reservoir and the compensating valve, a piston connected to said valve, means whereby the engineer's brake valve in running position will admit main reservoir air on opposite sides of said piston, and means whereby the engineer's brake valve in lap position will reduce the pressure on one side of said piston and thereby permit the main reservoir air on the opposite side of said piston to move the cut-off valve to open communication between the main reservoir and the compensating valve.

12. A compensating valve for air brake apparatus comprising a casing, a brake pipe diaphragm therein, an equalizing reservoir diaphragm therein, a brake pipe chamber, an equalizing reservoir chamber, an atmospheric chamber between the said diaphragms, the atmospheric chamber being connected to the brake pipe chamber through a passage, a brake pipe vent valve controlling said communication, a brake pipe supply valve controlling communication between a supply chamber and the brake pipe chamber, means rigidly connecting together said vent valve and the supply valve, and a cut-off valve controlling communication between a main reservoir chamber and the supply valve chamber.

13. A compensating valve for air brake apparatus comprising a casing, a brake pipe diaphragm therein, an equalizing reservoir diaphragm therein, a brake pipe chamber, an equalizing reservoir chamber, an atmospheric chamber between the said diaphragms, the atmospheric chamber being connected to the brake pipe chamber through a passage, a brake pipe vent valve controlling said communication, a brake pipe supply valve controlling communication between a supply chamber and the brake pipe chamber, means rigidly connecting together said bent valve and the supply valve, a cut-off valve controlling communication between a main reservoir chamber and the supply valve chamber, and a piston connected to said cut-off valve and adapted to move said valve to closed position when a dominating force is exerted on one side thereof and adapted to move said cut-off valve to open position when a dominating force is exerted on the other side thereof.

14. A compensating valve for air brake apparatus comprising a casing, a brake pipe diaphragm, an equalizing reservoir diaphragm therein, a brake pipe chamber, an equalizing reservoir chamber, an atmospheric chamber between the said diaphragms, the atmospheric chamber being connected to the brake pipe chamber through a passage, a brake pipe vent valve controlling said communication, a brake pipe supply valve controlling communication between a supply chamber and the brake pipe chamber, means rigidly connecting together said vent valve and the supply valve, a cut-off valve controlling communication between a main reservoir chamber and the supply valve chamber, a piston connected to said cut-off valve, a main reservoir chamber on one side of said piston, a supplemental main reservoir chamber on the opposite side of the said piston, and a spring bearing on said piston and tending to force it toward the main reservoir chamber and normally holding the cut-off valve in position to close communication between the main reservoir chamber and the supply valve chamber.

In testimony whereof I hereunto affix my signature.

SPENCER G. NEAL.